No. 620,323. Patented Feb. 28, 1899.
W. M. HOPE.
CAR SEAL.
(Application filed Mar. 28, 1898.)
(No Model.)
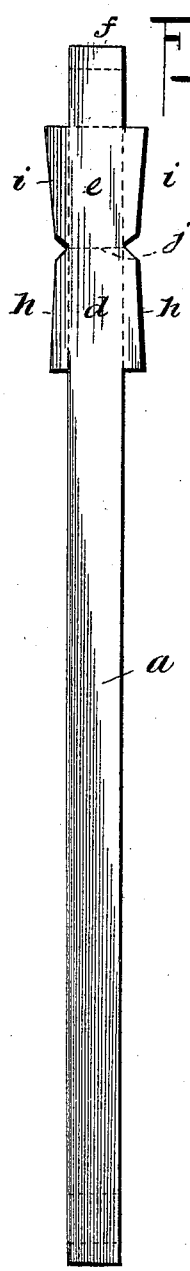
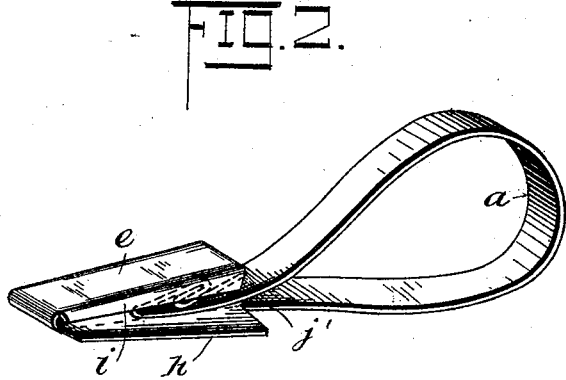
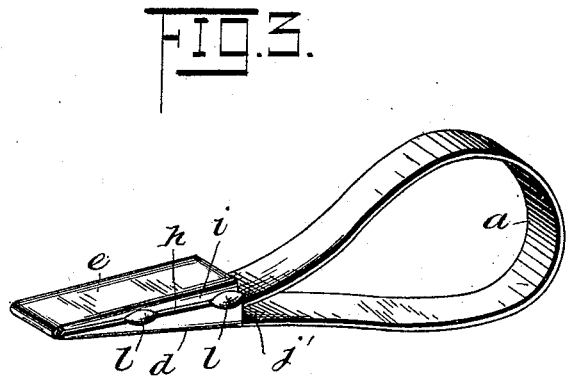
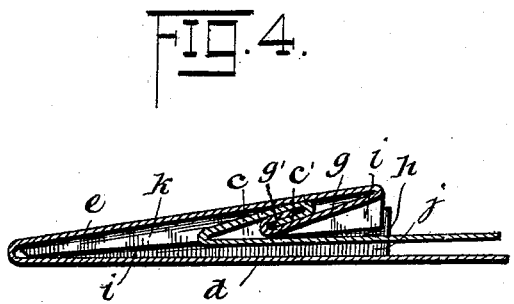
Witnesses:
David R. Turner
C. C. Hines
Inventor:
W. M. Hope,
By R. S. & A. B. Lacey,
Attorneys.

UNITED STATES PATENT OFFICE.

WILLIAM M. HOPE, OF OGDEN, UTAH, ASSIGNOR OF ONE-FOURTH TO CHARLES A. SMURTHWAITE, OF SAME PLACE.

CAR-SEAL.

SPECIFICATION forming part of Letters Patent No. 620,323, dated February 28, 1899.

Application filed March 28, 1898. Serial No. 675,445. (No model.)

*To all whom it may concern:*

Be it known that I, WILLIAM M. HOPE, a subject of the Queen of Great Britain, residing at Ogden, in the county of Weber and State of Utah, have invented certain new and useful Improvements in Car-Seals; and I do hereby declare the following to be a full, clear, and exact description of the invention, such as will enable others skilled in the art to which it appertains to make and use the same.

My invention relates to improvements in car-seals, and has for its object to provide a simple, cheap, and effective device of this class, which after being once used cannot be opened and reused without showing conspicuous evidence of the fact that it has been tampered with.

To this end my invention consists in a car-seal embodying certain novel features of construction and arrangement of parts, as will be hereinafter more fully described, and specifically set forth in the appended claim.

In the drawings hereto annexed and forming a part of this specification, Figure 1 is a plan view of the sheet-metal blank from which my improved car-seal is made. Fig. 2 is a perspective view of the seal as it appears when in use, with the flanges forming the wall at one side of the socket left open to expose the interlocking hooks. Fig. 3 is a similar view showing the socket closed. Fig. 4 is a longitudinal sectional view of the socket on an enlarged scale.

The blank shown in Fig. 1 consists of a sheet-metal band or strip $a$, provided at one end with an integral extension $b$, which is bent back upon the outer or under side thereof to form a hook $c$, which is in turn bent upon itself to form an inturned angularly-arranged lip $c'$. The band is also provided at its opposite end with an extension comprising three sections $d$, $e$, and $f$, the latter being bent over upon the inner or opposite side of the band to form a hook $g$, which, like the hook $c$, has its extremity bent to form a lip $g'$. The inner section $d$ is provided at opposite sides with flanges $h$, whose edges incline or converge outwardly toward the intermediate section $e$, while said intermediate section is likewise provided with flanges $i$, whose edges incline or converge inwardly toward the section $d$, as shown.

To form the completed seal, the flanges $h$ $i$ are first bent upward on the dotted lines at right angles to the sections $d$ $e$, the section $f$ turned over upon the section $e$ to form the hook $g$, as before described, and the said section $e$ then bent on the dotted line $j$, so as to overhang the inner section $d$ and so that its flanges $i$ will rest upon said inner section inside of the flanges $h$ thereof. A tapering socket $k$ is thereby formed, of which the section $d$ constitutes the bottom, the section $e$ the inclined top, and the flanges $h$ $i$ the sides. These flanges are then finally united to close the sides of the socket by solder $l$. The diverging open mouth $j'$ of this socket faces the opposite end of the band-carrying hook $c$, as shown, while the hook $g$ projects toward the rear of said socket and lies between the two upper flanges $i$. If desired, the outer side of the socket portion of the seal may be enameled to conceal the joints of its parts.

In operation it will be understood that the end of the band $a$ is passed through the staple on the car-door and then inserted into the mouth of the socket to engage the lip $g'$ of the hook $g$ with the lip $c'$ of the hook $c$, in the manner clearly shown in Fig. 4. When the seal is thus locked, it cannot be opened for reuse without completely demolishing the same or damaging it to such an extent as to show upon inspection that it has been tampered with.

Having thus fully described my invention, what I claim as new, and desire to secure by Letters Patent, is—

The improved car-seal herein described, comprising in its construction a band or strip $a$ provided at one end with a hook $c$ having a lip $c'$ and at its opposite end with a flaring socket $j$ whose mouth faces the said first-named end of the band, the said socket consisting of a bottom $d$, an inclined top $e$ bent at its point of junction with the bottom to form the closed rear end of the socket and folded over upon the same, said top being provided with an extension bent to form a hook $g$ located in the socket and having a lip $g'$, and flanges $h$ $i$ projecting from the sides of the said top and bottom portions and bent at right angles thereto and united to form the side walls of the socket, the edges of said flanges being inclined so that a tapering socket is thereby formed, substantially as described.

In testimony whereof I affix my signature in presence of two witnesses.

WILLIAM M. HOPE.

Witnesses:
HENRY G. SMURTHWAITE,
C. ALEX. CHATELAIR.